(12) United States Patent
Ikhlef

(10) Patent No.: US 7,149,284 B2
(45) Date of Patent: Dec. 12, 2006

(54) SEGMENTED COLLIMATOR ASSEMBLY

(75) Inventor: Abdelaziz Ikhlef, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 235 days.

(21) Appl. No.: 10/707,006

(22) Filed: Nov. 13, 2003

(65) Prior Publication Data

US 2005/0105691 A1    May 19, 2005

(51) Int. Cl.
*G21K 1/02* (2006.01)
(52) U.S. Cl. ............... 378/149; 378/147; 378/154; 250/505.1
(58) Field of Classification Search ........... 378/19, 378/98.8, 147, 149, 154, 155; 250/363.1, 250/370.09, 505.1
See application file for complete search history.

(56) References Cited

U.S. PATENT DOCUMENTS 3,988,589 A * 10/1976 Leask ................. 378/149
4,778,997 A * 10/1988 Doring ............... 250/363.1
5,557,650 A * 9/1996 Guida et al. ............. 378/154
5,949,850 A * 9/1999 Tang .................. 378/154
6,587,538 B1 * 7/2003 Igarashi et al. ........... 378/19

* cited by examiner

*Primary Examiner*—Allen C. Ho
(74) *Attorney, Agent, or Firm*—Peter Vogel; Artz & Artz, P.C.

(57) ABSTRACT

A detector assembly is provided comprising a collimator assembly. The collimator assembly comprises a first collimator segment having a first left end and a first right end. The first collimator segment includes a plurality of first segment longitudinal walls having a first segment depth. Each of the plurality of first segment longitudinal walls includes a first interlocking protrusion comprising only a portion of the first segment depth. The collimator assembly also includes a second collimator segment having a second left end and a second right end. The second collimator segment comprises a plurality of second segment longitudinal walls having a second segment depth. Each of the plurality of second segment longitudinal walls includes a second interlocking protrusion comprising only a portion of the second segment depth. Each of the second interlocking protrusions engages one of the first interlocking protrusions to form a continuous sidewall segment.

19 Claims, 3 Drawing Sheets

SEGMENTED COLLIMATOR ASSEMBLY

BACKGROUND OF INVENTION

The present invention relates generally to an x-ray beam collimator assembly, and, more particularly to a collimator assembly that can be manufactured as segments and assembled into larger collimators.

Computed tomography has been utilized for a wide variety of imaging applications. One such category of applications is comprised of medical imaging. Although it is known that computed tomography may take on a wide variety of configurations within the medical industry, it commonly is based on the transmission of low energy rays (x-rays) through a body structure. These low energy rays are subsequently received and processed to formulate an image, often three-dimensional, of the body structure that can by analyzed by clinicians as a diagnostic aid.

The reception of the low energy rays, such as x-ray photons produced in an x-ray tube, is often accomplished through the use of a device referred to as a scintillator camera or detector array. The scintillator camera or detector array is typically comprised of a plurality of structures working in concert to receive and process the incoming energy rays after they have passed through the body structure. The scintillator element is commonly a material with the ability to absorb the x-ray photons and convert their energy into light. This allows the low energy rays received by the scintillator camera to be converted into useful information. Scintillator elements may come in a wide variety of forms and may be adapted to receive a wide variety of incoming rays. The light produced by the scintillator element is commonly processed by way of a device such as a light sensitive photodiode which converts the light from the scintillator element into an amplified electronic signal. In this fashion, the information from the scintillator camera can be easily transferred, converted, and processed by electronic modules to facilitate viewing and manipulation by clinicians.

A collimator is an element often found in a scintillator camera that is used to limit the direction of photons as they approach the scintillator detecting element. The collimator is commonly used to increase the signal to scatter rejection ratio and magnification of a viewed object or control resolution or field of view. Their primary purpose, however, is to control the photons impinging on the scintillator element. The collimator components often consist of a matrix of tungsten plates. These elements must be aligned with the scintillator and the x-ray focal spot of the x-ray source. The height of the collimator elements in the y-direction (direction along the x-ray beam) is critical for scatter rejection. This scenario presents the following challenges when using the state of the art technology, where plates are used to reject scatter in one direction: Plate bow along the z-direction (along the axis of the patient in CT system) is often realized. Alignment of the scintillation detector array (often referenced as a pack) to the collimator in both x and z-directions (perpendicular plan to the direction of the x-ray beam) can be difficult. Focal alignment of the plates can be difficult and costly. Improper manufacturing can result in undesirable sensitivity to focal spot motion.

The concerns with collimator construction are further increased as longer z-direction images are desired, especially for volumetric imaging gains prominence, larger collimator elements are often required. Manufacturing limitations, however, often present significant challenges to such larger collimator elements. As collimator size increases, plate bow, dimensional accuracy, and alignment can all begin to negatively impact collimator and detector performance. Although high precision manufacturing, fixturing, and precision features can at least partially address these concerns, they often are associated with undesirable cost increases. One approach is to manufacture the collimator in a series of individual modules that may be assembled prior to installation in the imaging system. The interface between adjoining modules, however, can become difficult to shield. The edge between modules can become unshielded and negatively impact the resultant image produced by the imaging system.

It would, therefore, be highly desirable to have a collimator assembly that could be manufactured in a modular/segmented fashion and thereby improve dimensional tolerance and precision features. It would additionally be highly desirable to have a modular collimator assembly with improved assembly properties such that proper shielding can be maintained.

SUMMARY OF INVENTION

A detector assembly is provided comprising a collimator assembly. The collimator assembly comprises a first collimator segment having a first left end and a first right end. The first collimator segment includes a plurality of first segment longitudinal walls having a first segment depth. Each of the plurality of first segment longitudinal walls includes a first interlocking protrusion comprising only a portion of the first segment depth. The collimator assembly also includes a second collimator segment having a second left end and a second right end. The second collimator segment comprises a plurality of second segment longitudinal walls having a second segment depth. Each of the plurality of second segment longitudinal walls includes a second interlocking protrusion comprising only a portion of the second segment depth. Each of the second interlocking protrusions engages one of the first interlocking protrusions to form a continuous sidewall segment.

Other features of the present invention will become apparent when viewed in light of the detailed description of the preferred embodiment when taken in conjunction with the attached drawings and appended claims.

DETAILED DESCRIPTION

Figure 1:
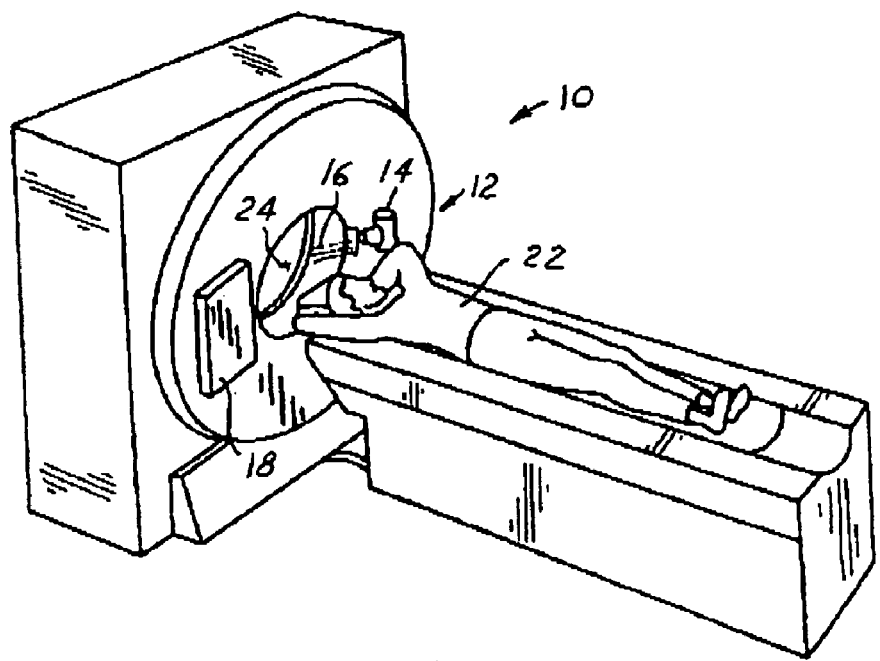
FIG. 1 is an illustration of a computed tomography imaging system for use with the present invention.

Referring now to FIG. 1, which is an illustration of a computed tomography (CT) imaging system 10 for use with the detector assembly 18 of the present invention. Although a particular CT imaging system 10 has been illustrated, it should be understood that the detector assembly 18 of the present invention can be utilized in a wide variety of imaging systems. The CT imaging system 10 includes a scanner assembly 12 illustrated as a gantry assembly. The scanner assembly 12 includes an x-ray source 14 for projecting a beam of x-rays 16 toward a detector assembly 18 positioned opposite the x-ray source 14. The detector assembly 18 senses the projected x-rays 16 that pass through an object, such as a medical patient 22. The detector assembly 18 produces an electrical signal that represents the intensity of an impinging x-ray beam and hence the attenuation of the beam 16 as it passes through the object of patient 22. Commonly, during a scan to acquire x-ray projection data, the scanner assembly 12 is rotated about the center of rotation 24. The detector assembly 18 can be arranged such that projection data corresponding to a plurality of parallel slices can be acquired simultaneously during a scan.

Figure 2:
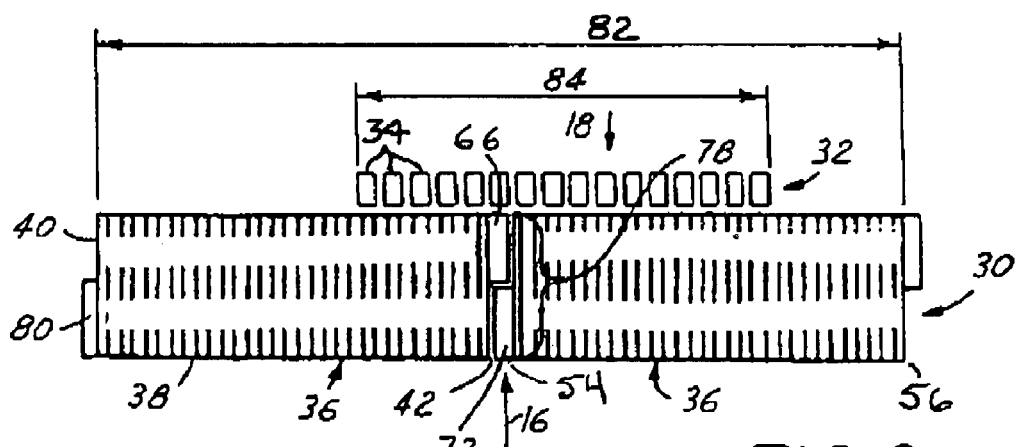
FIG. 2 is a side view illustration of a portion of the detector assembly illustrated in FIG. 1.

The detector assembly 18 is comprised of a collimator assembly 30 and a scintillator assembly 32 (see FIG. 2). The scintillator assembly 32 comprises a plurality of scintillator elements 34 used to convert x-ray photons into light and in turn into usable electronic signals. The design, use, and development of scintillator assemblies 32 is well known. The present invention further includes an extended collimator assembly 30. The present invention addresses the manufacturing concerns involved with producing elongated collimator assembles by creating a collimator assembly 30 formed from a plurality of individually manufactured collimator segments 36.

Figure 3:
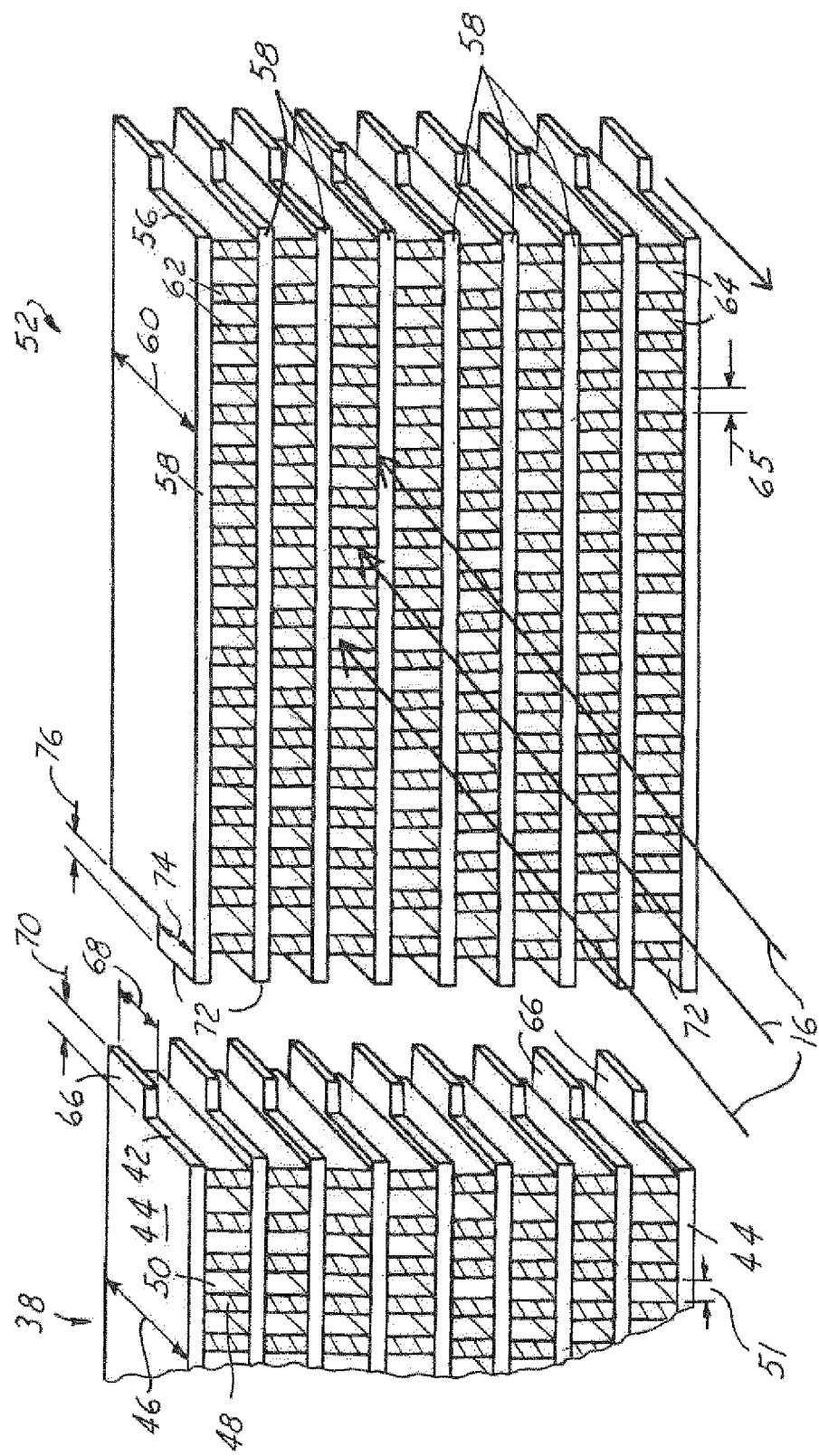
FIG. 3 is a three-dimensional illustration of a collimator assembly for use in the detector assembly illustrated in FIG. 2.
Figure 4:
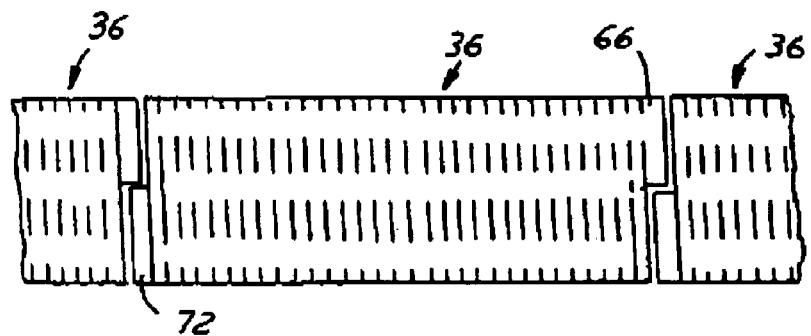
FIG. 4 is a side view illustration of an alternate arrangement of the portion of the detector assembly illustrated in FIG. 2.
Figure 6:
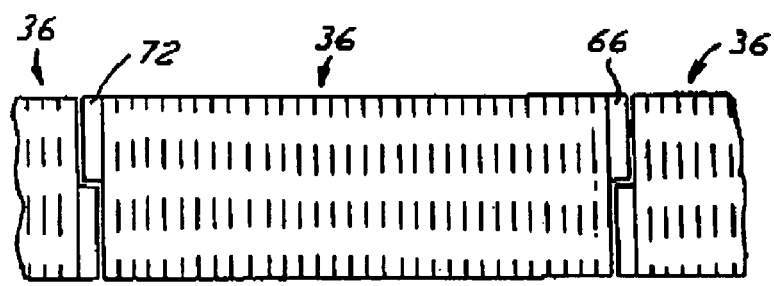
FIG. 6 is a detail illustration of a side view illustration of the portion of the detector assembly illustrated in FIG. 2, the alternate embodiment illustrating a simple mirror image formation.

FIGS. 2 and 3 illustrate the collimator assembly 30 comprised of a plurality of individual segments 36. Although only two individual segments 36 are illustrated in FIGS. 2 and 3, it should be understood that additional segments 36 may be included (see FIG. 4). The collimator assembly 30 is comprised of a first collimator segment 38 that has a first left end 40 and a first right end 42 (it should be understood that the terms left and right are descriptive only). The first collimator segment 38 is comprised of a plurality of first segment longitudinal walls 44 each having a first segment depth 46. Although a variety of manufacturing techniques are contemplated for producing the first collimator segment 38, one embodiment contemplates casting the first collimator segment 38 out of tungsten or lead. A plurality of first latitudinal segments 48 are positioned between the plurality of first segment longitudinal walls 44 such that a plurality of first collimator chambers 50 is formed. Each of the first collimator chambers 50 preferably has a similar first collimator width 51. The plurality of first collimator chambers 50 are utilized to allow x-ray photons 16 to pass through the collimator assembly 30 to reach the scintillator assembly 32 while reducing scatter radiation.

The present invention further contemplates the use of a second collimator segment 52 as part of the collimator assembly 10. The second collimator segment 52 has a second left end 54 and a second right end 56. The second collimator segment 52 is comprised of a plurality of second segment longitudinal walls 58 each having a second segment depth 60. Although a variety of manufacturing techniques are contemplated for producing the second collimator segment 52, one embodiment contemplates casting the second collimator segment 52 out of tungsten or lead. A plurality of second latitudinal segments 62 are positioned between the plurality of second segment longitudinal walls 58 such that a plurality of second collimator chambers 64 is formed. Each of the second collimator chambers 64 preferably has a similar second collimator width 65. The plurality of second collimator chambers 64 are utilized to allow x-ray photons 16 to pass through the collimator assembly 10 to reach the scintillator assembly 32 while reducing scatter radiation.

Figure 5:
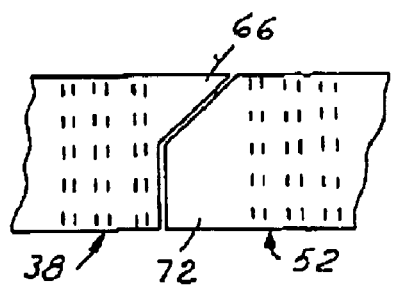
FIG. 5 is a detail illustration of an alternate embodiment of the collimator assembly illustrated in FIG. 2, the embodiment illustrating a triangular protrusion.

The present invention provides a unique method and structure for combining the first collimator segment 38 and the second collimator segment 52 to form a collimator assembly 30 that minimizes problems associated with unshielded interfaces between collimator segments. The present invention accomplishes this through the use of a first interlocking protrusion 66 formed on each of the plurality of first segment longitudinal walls 44. Each of the plurality of first interlocking protrusions 66 is formed as a portion of one of the first segment longitudinal walls 44 and comprises only a portion of the first segment depth 46. The first interlocking protrusions 66 extend past the last first latitudinal segment 48 defining the first right end 42. The first interlocking protrusions 66 have a first protrusion height 68 and a first protrusion depth 70. The first protrusion height 68, depth 70, and the very geometry of the first interlocking protrusion 66 can be varied. One embodiment contemplates the first protrusion depth 70 is less than or equal to the first collimator width 51. Another embodiment contemplates the first protrusion height 68 being less than or equal to half of the first segment depth 46. Finally, although the first interlocking protrusion 66 can be formed in any geometric shape, illustrated embodiments contemplate block shaped protrusions (FIGS. 2, 3, 4 and 6) as well as triangular shaped protrusions (FIG. 5).

The first interlocking protrusions 66 are designed to mate and interlock with a plurality of second interlocking protrusions 72 formed on each of the plurality of second segment longitudinal walls 58. Each of the plurality of second interlocking protrusions 72 is formed as a portion of one of the second segment longitudinal walls 58 and comprises only a portion of the second segment depth 60. The second interlocking protrusions 72 extend past the beginning second latitudinal segment 62 defining the second left end 54. The second interlocking protrusions 72 have a second protrusion height 74 and a second protrusion depth 76. Each of the second interlocking protrusions 72 is designed to engage one of the first interlocking protrusions 66 such that a continuous sidewall segment 78 is formed between the first collimator segment 38 and second collimator segment 52. In this fashion, each of the first segment longitudinal walls 44 can be joined to one of the second segment longitudinal walls 58 by way of a continuous sidewall segment 78 without a vertical seam passing through the collimator assembly 30. In this fashion scatter corruption can be minimized. Although the second interlocking protrusions 72 may be varied in a fashion similar to the first interlocking protrusions 66, they are preferably shaped so as to form the mirror negative image (see FIG. 4) of the first interlocking protrusions 66. In this fashion the first and second protrusions 66, 72 naturally mate to form the continuous wall segments 78. A similar technique can be accomplished by forming the second locking protrusions 72 as simple mirror images (see FIG. 7) and altering orientation of the adjoining collimator segments 36.

Although the first collimator segment 38 and the second collimator segment 52 can be formed as unique mating components, it is contemplated that by forming the a plurality of opposing interlocking protrusions 80 on the first left end 40 of the first collimator segment 38 can be used such that a single design can be utilized to form both the first and second collimator segments 38, 52. In such an arrangement (see FIG. 2) each of the opposing interlocking protrusions 80 would be positioned on the longitudinal wall end opposite one of the first interlocking protrusions 66 and comprise only a portion of the first segment depth. Each of the opposing interlocking protrusions 80 would preferably be a mirror negative to the first interlocking protrusion 66 it opposed. In this fashion, a single casting design could be used and a single collimator segment 38 could be sold. Multiples of this single collimator segment 38 could be combined such that a collimator assembly 10 can be formed with a collimator assembly longitudinal width 82 greater than the scintillator longitudinal width 84. In this fashion, the collimator segments 38 can be combined in different numbers to accommodate a wide variety of different scintillator designs and sizes.

While particular embodiments of the invention have been shown and described, numerous variations and alternative embodiments will occur to those skilled in the arm. Accordingly, it is intended that the invention be limited only in terms of the appended claims.

The invention claimed is:

1. A detector assembly comprising:
   a collimator assembly comprising:
   a first collimator segment having a first left end and a first right end, said first collimator segment comprising:
   a plurality of x-ray blocking first segment longitudinal walls having a first segment depth, each of said plurality of first segment longitudinal walls including a first interlocking protrusion comprising less than an entire portion of said first segment depth, said plurality of first segment longitudinal walls configured to be planar to projected x-rays;
   a second collimator segment having a second left end and a second right end, said second collimator segment comprising:
   a plurality of x-ray blocking second segment longitudinal walls having a second segment depth, each of said plurality of second segment longitudinal walls including a second interlocking protrusion comprising less than an entire portion of said second segment depth, each of said second interlocking protrusions engaging one of said first interlocking protrusions to form a continuous sidewall segment; and
   a plurality of first latitudinal segments positioned between each of said plurality of first longitudinal walls such that a plurality of first collimator chambers is formed, each of said first collimator chambers having a first collimator width.

2. A detector assembly as described in claim 1, wherein said first interlocking protrusion comprises a block shaped protrusion.

3. A detector assembly as described in claim 1, wherein said first interlocking protrusion comprises a triangular shaped protrusion.

4. A detector assembly as described in claim 1, wherein said plurality of first segment longitudinal walls comprise cast tungsten.

5. A detector assembly as described in claim 1, wherein said plurality of first segment longitudinal walls comprise cast lead.

6. A detector assembly as described in claim 1, wherein each of said first interlocking protrusions comprises a first protrusion width, said first protrusion width less than or equal to said first collimator width.

7. A detector assembly as described in claim 1, wherein:
   said first collimator segment comprises a first collimator height;
   said first interlocking protrusion comprising a first protrusion height;
   said second interlocking protrusion comprising a second protrusion height; and
   said first protrusion height added to said second protrusion height equaling said first collimator height.

8. A detector assembly as described in claim 1, further comprising:
   a scintillator assembly in communication with said collimator assembly, said scintillator assembly having a scintillator longitudinal width, said scintillator longitudinal width smaller than a collimator assembly longitudinal width.

9. A detector assembly as described in claim 1, wherein said first collimator segment further comprises:
   a plurality of opposing interlocking protrusions each of which is formed on one of said a plurality of first segment longitudinal walls, each of said plurality of opposing interlocking protrusions positioned opposite one of said first interlocking protrusions, said opposing interlocking protrusion comprising only a portion of said first segment depth.

10. A detector assembly as described in claim 9, wherein each of said opposing interlocking protrusions creates a mirror negative to one of said first interlocking protrusions.

11. A detector assembly as described in claim 1, wherein said plurality of first collimator chambers forms a rectangular array.

12. A collimator assembly segment for mating to a second collimator segment comprising a plurality of second segment longitudinal walls having a second segment depth, each of the plurality of second segment longitudinal walls having a second interlocking protrusion having a second protrusion height comprising less than an entire portion of the second segment depth, comprising:
   a first collimator segment having a first left end and a first right end, said first collimator segment comprising:
   a plurality of x-ray blocking first segment longitudinal walls having a first segment depth, each of said plurality of first segment longitudinal walls including a first interlocking protrusion comprising less than an entire portion of said first segment depth, each of said first interlocking protrusions shaped to engage one of the second interlocking protrusions to form a continuous sidewall segment, said plurality of first segment longitudinal walls configured to be planar to projected x-rays; and
   a plurality of first latitudinal segments positioned between each of said plurality of first longitudinal walls such that a plurality of first collimator chambers is formed, each of said first collimator chambers having a first collimator width.

13. A collimator assembly segment as described in claim 12, further comprising:
   a plurality of first latitudinal segments positioned between each of said plurality of first longitudinal walls such that a plurality of first collimator chambers is formed, each of said first collimator chambers having a first collimator width.

14. A detector assembly as described in claim 13, wherein each of said first interlocking protrusions comprises a first protrusion width, said first protrusion width less than or equal to said first collimator width.

15. A detector assembly as described in claim 12, wherein:
- said first collimator segment comprises a first collimator height;
- said first interlocking protrusion comprising a first protrusion height;
- said first protrusion height added to the second protrusion height equaling said first collimator height.

16. A detector assembly as described in claim 12, wherein said first collimator segment further comprises:
- a plurality of opposing interlocking protrusions each of which is formed on one of said a plurality of first segment longitudinal walls, each of said plurality of opposing interlocking protrusions positioned opposite one of said first interlocking protrusions, said opposing interlocking protrusion comprising only a portion of said first segment depth.

17. A detector assembly as described in claim 16, wherein each of said opposing interlocking protrusions creates a mirror negative to one of said first interlocking protrusions.

18. A method of manufacturing a detector assembly with extended longitudinal depth comprising:
- casting a first collimator segment comprising a plurality of first segment longitudinal walls having a first segment depth, each of said plurality of first segment longitudinal walls including a first interlocking protrusion comprising less than an entire portion of said first segment depth;
- casting a second collimator segment comprising a plurality of second segment longitudinal walls having a second segment depth, each of said plurality of second segment longitudinal walls including a second interlocking protrusion comprising less than an entire portion of said second segment depth;
- engaging each of said second interlocking protrusions with one of said first interlocking protrusions to form a plurality of continuous sidewall segments.

19. A method of manufacturing a detector assembly, as described in claim 18 further comprising:
- casting a plurality of first latitudinal segments between each of said plurality of first longitudinal walls such that a plurality of first collimator chambers is formed, each of said first collimator chambers having a first collimator width; and
- casting said first interlocking protrusions and said second interlocking protrusions such that said first interlocking protrusions and said second interlocking protrusions combine to match said first segment.

\* \* \* \* \*